United States Patent [19]

Vocal

[11] Patent Number: 4,586,283
[45] Date of Patent: May 6, 1986

[54] HOOK SETTER

[76] Inventor: Rodolfo S. Vocal, 1451 Lucas Rd., Mansfield, Ohio 44901-0637

[21] Appl. No.: 745,781

[22] Filed: Jun. 17, 1985

[51] Int. Cl.$^4$ ............................................. A01K 97/00
[52] U.S. Cl. ........................................................ 43/15
[58] Field of Search ..................... 43/15, 16, 17, 44.88

[56] References Cited

U.S. PATENT DOCUMENTS

| | | | |
|---|---|---|---|
| 542,917 | 7/1895 | Bardsley | 43/15 |
| 711,318 | 10/1902 | Hymers | 43/15 |
| 1,816,235 | 7/1931 | Schroeder | 43/15 |
| 2,523,927 | 9/1950 | Stallings | 43/15 |
| 2,631,399 | 3/1953 | Sowa | 43/15 |
| 2,712,194 | 7/1955 | Stefano | 43/15 |
| 2,784,515 | 3/1957 | McBride | 43/15 |
| 2,858,634 | 11/1958 | Bremer | 43/15 |
| 3,621,599 | 11/1971 | Uhlich | 43/15 |

Primary Examiner—Gene P. Crosby
Attorney, Agent, or Firm—Oldham, Oldham & Weber Co.

[57] ABSTRACT

Disclosed is a water fishing device or hook setter which can be left unattended. The hook setter includes a circular or polygonal floating base member having a plurality of diagonal frame members which are joined together at their upper ends by a top piece. Suspended from the top piece are a resilient member (a rubber band or spring), a trigger mechanism which includes a hook that engages a fixedly mounted bracket, and a fishing line suspended from the hook. When a fish pulls on the fishing line, the hook is disengaged from the bracket, and the rubber band or spring pulls the fishing line and fish toward the hook setter.

5 Claims, 5 Drawing Figures

HOOK SETTER

TECHNICAL FIELD

This invention relates to fishing devices. More particularly, this invention relates to a water fishing device or hook setter which is capable of catching fish while unattended.

BACKGROUND ART

Fishing devices which may be interposed in a fishing line between the fishing pole and the fish hook are well known. Such devices typically include a float, a tension spring and a trigger mechanism which is released when a fish pulls on the line. The fishing line extends in one direction from the fishing device back to the fishing pole, and in the other direction from the fishing device (usually from the trigger mechanism) to a hook. Devices of this sort are shown, for example, in U.S. Pat. Nos. 542,917 to Bardsley, 711,318 to Hymers, 1,816,235 to Schroeder, 2,523,927 to Stallings, and 2,712,194 to Di Stefano. Such devices will automatically jerk the fishing line, releasing the trigger mechanism and pulling the fish in toward the fishing device when a fish bites on a hook. A fishing device enables the fisherman to catch fish which might otherwise get away. However, it is necessary for the fisherman to hold his fishing pole at all times while he is fishing.

An ice fishing device which can be left unattended is described in U.S. Pat. No. 3,621,599 to Uhlich et al.

There exists a need for a simple and yet reliable device which will enable a fisherman engaged in water fishing to catch fish even while the fishing device or hook setter is unattended. The present invention provides such a device.

DISCLOSURE OF INVENTION

It is an object of this invention to provide a simple and reliable floating water fishing device which will catch fish even while left unattended.

A related object is to provide a water fishing device which will enable a fisherman to bait a fish hook, go off and leave the fishing device unattended, and return later to remove any fish which have been caught.

According to this invention, there is provided a free-standing floating fishing device comrising an open, generally conical or pyramidal frame which includes an open, generally ring-shaped or polygonal base member which is adapted to float on the surface of the water and a plurality of converging diagonal frame members extending upwardly from the base member, a resilient tension member suspended from the frame near the top thereof, a trigger mechanism including a movable member for engaging the lower end of the resilient member and normally holding resilient member in tension, and means for suspending a fishing line from the movable member of the trigger mechanism.

BRIEF DESCRIPTION OF DRAWINGS

A preferred embodiment of the present invention will now be described with reference to the drawings, in which.

BEST MODE FOR CARRYING OUT THE INVENTION

Figure 1:
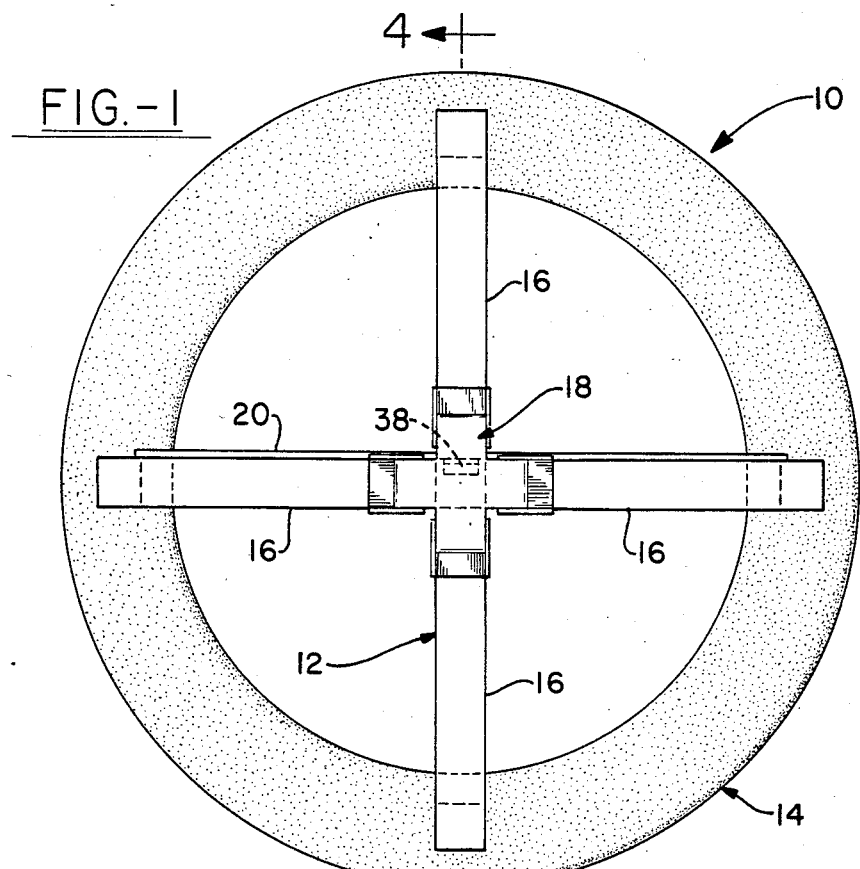
FIG. 1 is a top view of the device of this invention.
Figure 2:
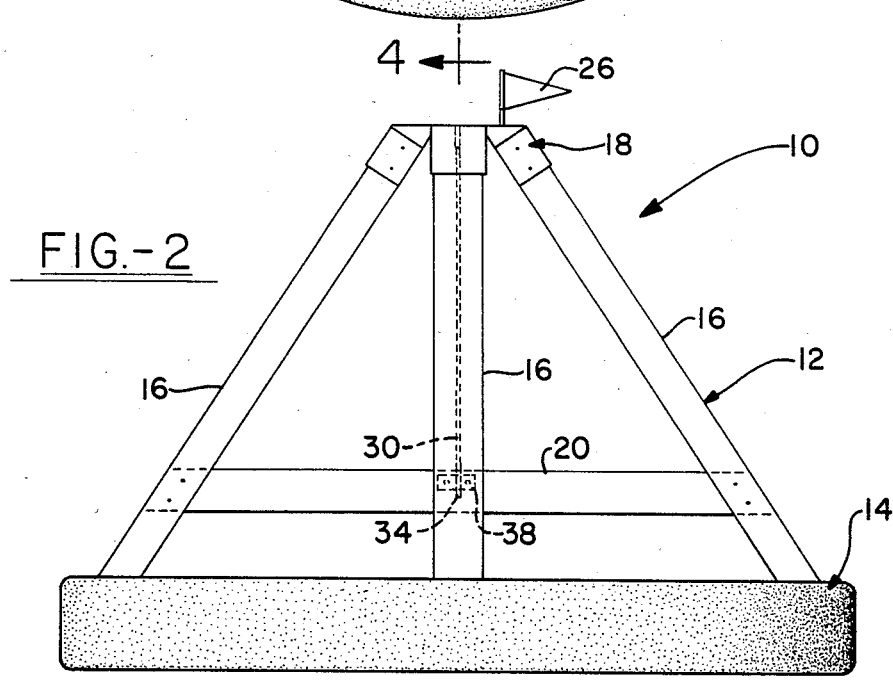
FIG. 2 is a front elevational view of the device of this invention.
Figure 3:
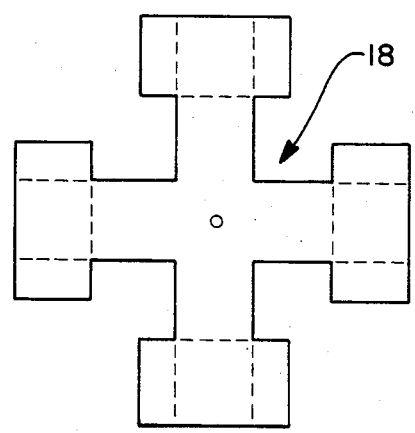
FIG. 3 is a top view showing in detail the cross piece at the top of the device according to this invention.

Referring now to FIGS. 1, 2 and 4, 10 indicates generally the water fishing device or hook setter according to this invention. Fishing device 10 comprises an open generally conical or pyramidal frame 12, which frame includes an open generally ring-shaped or polygonal base member 14 which is adapted to float on the surface of the water, a plurality (4 in the embodiment shown) of converging diagonal frame members 16 extending upwardly from the base member 14, a cross-shaped top piece 18 (best seen in FIG. 3) which has four (4) arms which are secured respectively to the four (4) diagonal frame members 16, and a furring strip 20, which extends horizontally between two (2) diametrically opposite diagonal frame members 16 and which supports the stationary member of a trigger release mechanism as will be hereinafter described.

The base member 14 is a floating member, preferably of very light weight so as to give buoyancy to the entire frame structure. This base member is preferably made of a foamed plastic, and in particular foamed polystyrene, which is popularly known by the tradename "Styrofoam". This member is in the shape of a closed geometric figure i.e., either a circle, a regular polygon (e.g. a square or regular hexagon) or alternatively (but not preferably) an irregular polygon, which has a hole in the middle. This member is preferably circular in shape (i.e., doughnut shaped).

The diagonal frame members 16 are preferably made of wood. They are typically disposed at equal angles around the circumference or perimeter of the base member 14. These frame members 16 extend upwardly and inwardly from base member 14 toward the center axis of the hook setter 10. The edges of frame member 16 are beveled so that they are horizontal. The preferred embodiment shown has four (4) such frame members. Frame members 16 are secured to the base member 14 by nails or screws 22 which preferably extend through tubes or sheaths 24.

The upwardly extending frame members 16 are light in weight. They may be 1"×1" board members. Base member 14 is much larger in cross-sectional area, so that, despite its low density and light weight, the center of gravity of the frame as a whole is comparatively low and the structure is stable.

A cross-shaped sheet metal top piece 18 (FIG. 3) holds the frame members 16 together at their upper ends. Top piece 18 may be made of any desired metal, e.g. aluminum. Top piece 18 has holes so that it may be secured to frame members 16 by nails or screws. The dotted lines in FIG. 3 indicate the lines along which top piece 18 are bent in the assembled hook setter 10.

A flag 26, which may contain identifying data such as the name and address of the owner, may be placed at the top of hook setter 10.

Suspended from the top piece 18 is a resilient tension member 30, which may be either a rubber band or a spring. A rubber band is preferred because it faster in its response when a fish bites the hook. Resilient member 30 is suspended from the top piece 18 by means of a short wire 32, which has a hook on its end and which extends through a hole in the center of the top piece.

Resilient member 30 thus hangs verticallly from the center of the frame 12.

Figure 5:
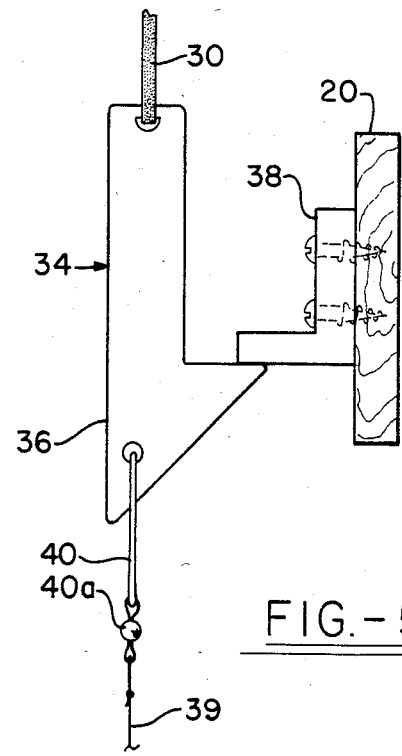
FIG. 5 is a front elevational view showing the trigger mechanism of this invention in detail.
Figure 4:
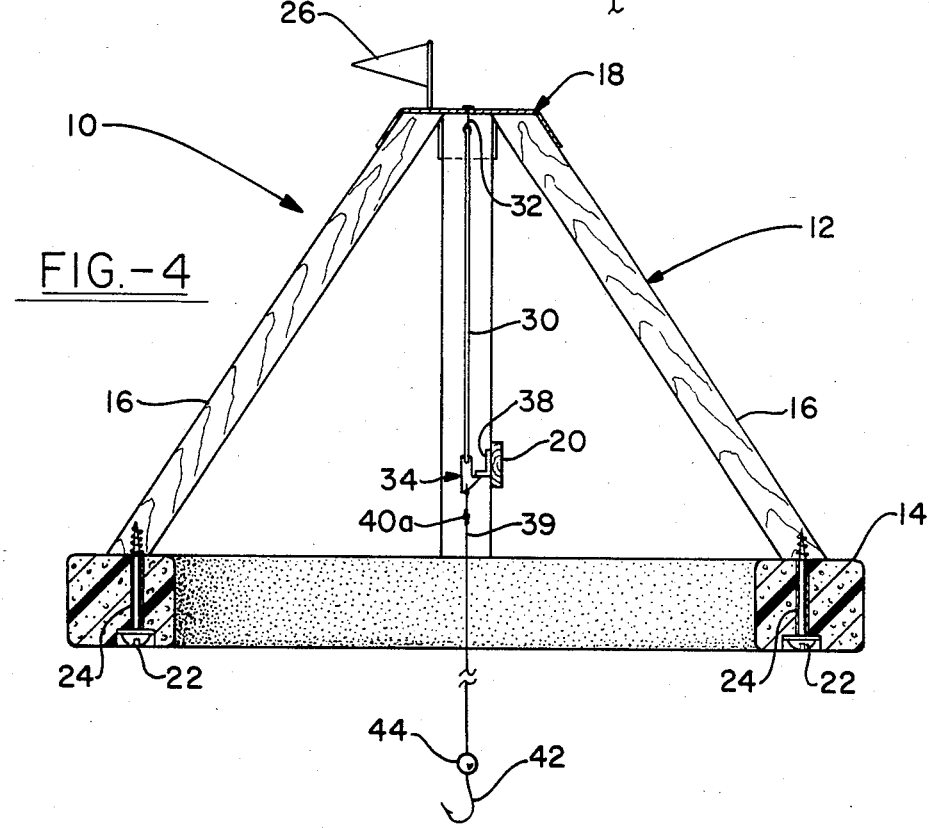
FIG. 4 is a vertical sectional view taken along line 4—4 of FIG. 1.

A lock trigger mechanism 34 holds the resilient member 30 in tension. This lock trigger mechanism, as best seen in FIG. 5, has a movable member, here shown as hook 36, which engages a stationary member, here shown as an L-bracket 38, which is secured to the furring strip 20 by suitable means such as nails or screws. Hook 36 has an eyelet at its upper end for the rubber band 30 and an eyelet at its lower end for fastening the fishing line 40. The fishing line may be conventional. The fishing line here illustrated includes a swivel 40a, which is a short length of line with a loop tied on its lower end and with its upper end tied to hook 36. The fishing line also includes a much longer length of fishing line 38, which is tied to the swivel 36 and which has a fish hook 42 at its end and a sinker 44.

The fisherman sets up the hook setter of this invention in the manner shown with the lock trigger mechanism set (i.e. with hook 36 engaging L-bracket 38) and with the rubber band 30 held in tension by the trigger mechanism. When a fish bites on the fish hook 42, the trigger mechanism 34 is released, the rubber band 30 pulls on the fishing line 38, jerking the line and more firmly drawing hook 42 into the mouth of the fish. The apparatus of this invention not only furnishes the necessary jerk to hook a fish firmly, which prior fishing devices have also done; it also is capable of standing alone and catching fish even when the fisherman is not present. The fisherman simply baits the hook 42, goes on to other matters, and returns later to remove any fish which have been caught.

The present invention provides a simple and inexpensive, yet highly reliable, water fishing device that can be left unattended. The present device uses inexpensive materials, e.g. "Styrofoam", wood and a rubber band, and production costs are low. The overwhelming majority of presently known fishing devices are attached to a fisherman's line and require the fisherman's full time attention. The few presently known water fishing devices that will hook fish while unattended are complex. The present invention fulfills a need for a simple and inexpensive, yet reliable, water fishing device that can be left unattended.

In accordance with the Patent statutes, only the best mode and preferred embodiment of the invention has been illustrated and described in detail. It is to be understood that the invention is not limited thereto, but that the scope is defined by the appended claims.

What is claimed is:

1. A free-standing floating water fishing device capable of catching fish while unattended, said fishing device comprising:

an open generally pyramidal shaped frame which includes (1) a base member having a hole in the middle and adapted to float on the surface of the water, and (2) a plurality of converging diagonal frame members extending upwardly from said base member and secured in a fixed relationship at their upper ends;

a resilient tension member suspended from said frame near the top thereof;

a trigger mechanism including a movable member for engaging the lower end of said resilient tension member and normally holding said tension member in tension; and means for suspending a fishing line from said movable member of said trigger mechanism through said hole.

2. A fishing device according to claim 1 in which said base member is circular in shape.

3. A fishing device according to claim 1 in which said base member is made of a light weight foamed plastic.

4. A fishing device according to claim 1 in which said diagonal members are wood.

5. A fishing device according to claim 1 in which said resilient tension member is a rubber band.

* * * * *